(12) United States Patent
Kruse

(10) Patent No.: US 6,349,781 B1
(45) Date of Patent: *Feb. 26, 2002

(54) TRANSMISSION FOR A STEERABLE DRIVE WHEEL OF A FORKLIFT

(75) Inventor: Rainer Kruse, München (DE)

(73) Assignee: ZF Friedrichshafen AG, Friedrichshafen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/318,859

(22) Filed: May 26, 1999

(30) Foreign Application Priority Data

Jun. 12, 1998 (DE) .......................................... 198 26 067

(51) Int. Cl.[7] .............................................. B62D 57/00

(52) U.S. Cl. ....................... 180/7.2; 180/253; 180/65.6; 74/421 A; 74/606 R

(58) Field of Search ............................... 180/65.5, 65.6, 180/263, 260, 261, 262, 7.2, 253, 254, 265, 374, 383, 252; 74/420, 421 A, 606 R

(56) References Cited

U.S. PATENT DOCUMENTS

| | | | | |
|---|---|---|---|---|
| 3,534,825 A | * | 10/1970 | Reffle .......................... | 180/252 |
| 3,765,259 A | * | 10/1973 | Firth ........................... | 74/354 |
| 3,812,736 A | * | 5/1974 | Nickstadt ....................... | 74/404 |
| 3,901,337 A | * | 8/1975 | Cragg .......................... | 180/6.5 |
| 4,116,091 A | * | 9/1978 | Susdorf et al. ................ | 74/801 |
| 4,372,176 A | * | 2/1983 | Terry ........................... | 74/409 |
| 4,391,157 A | * | 7/1983 | Jacklin ......................... | 74/402 |
| 4,461,367 A | * | 7/1984 | Eichinger et al. ............. | 180/252 |
| 4,513,839 A | * | 4/1985 | Nieminski et al. ............ | 180/253 |
| 4,518,287 A | * | 5/1985 | Bossler, Jr. .................... | 409/26 |

(List continued on next page.)

FOREIGN PATENT DOCUMENTS

| | | |
|---|---|---|
| DE | 31 33 027 A1 | 3/1983 |
| DE | 35 01 578 A1 | 8/1985 |
| DE | 81 21 384.7 | 5/1986 |
| DE | 4230429 A1 * | 3/1994 |
| DE | 4413759 A1 * | 10/1995 |
| DE | 44 24 305 A1 | 1/1996 |
| RU | 2025615 C1 * | 12/1994 |

OTHER PUBLICATIONS

Mechanical Design—Bevel Gears; GlobalSpec.com—searchable engineering catalog on the net, Sep. 8, 1995.*
Neimann and Winter; pub: Springer, 1983, pp. 22 and 56.
Niemann: Maschinenelemente, Springer–Verlag, 1965, 2.Bd., S. 144–2. 150.
Föster, Hans Joachim: Die Kraftübertragung im Fahrzeug vom Motor bis zu den Rädern, Verlag TÜV Rheinland GmbH, Köln, 1987, S. 178–180.
Söffge, Friedhelm, u.a.: 911 Carrera 4, der Allrad–Porsche—Teil 2. In: ATZ Automobiltechnische Zeitschrift 91, 1989, 1, S. 15–24.

*Primary Examiner*—Brian L. Johnson
*Assistant Examiner*—Daniel Yeagley
(74) *Attorney, Agent, or Firm*—Davis & Bujold, P.L.L.C.

(57) ABSTRACT

In a transmission for a steerable drive wheel (4) of a forklift, which transmission is pivotable around a vertical axle (8) and contains a spur gear stage (24, 26) and a second reduction stage formed by a pinion shaft (28, 30) and a bevel wheel (36), the second reduction stage is designed as hypoid wheel set (30, 36) with positive axle offset. Unlike the designs known already, it is hereby possible, by adhering to preset limits of the outer dimensions and a preset reduction ratio, to obtain a toothing of more supporting capacity and a thicker pinion shaft (28) so that the loads of the tooth flanks are canceled and it is possible to use a design of a high loaded pinion bearing (34) having more supporting capacity.

5 Claims, 2 Drawing Sheets

U.S. PATENT DOCUMENTS

| | | | | |
|---|---|---|---|---|
| 4,610,327 A | * | 9/1986 | Orain | 180/380 |
| 4,612,816 A | * | 9/1986 | Chalik | 74/401 |
| 5,375,479 A | * | 12/1994 | Kouno et al. | 74/420 |
| 5,558,174 A | * | 9/1996 | Avitan | 180/60 |
| 5,634,374 A | * | 6/1997 | Depietri | 74/420 |
| 5,775,975 A | * | 7/1998 | Mizuno et al. | 451/47 |
| 5,953,964 A | * | 9/1999 | Cognigni et al. | 74/606 R |

* cited by examiner

TRANSMISSION FOR A STEERABLE DRIVE WHEEL OF A FORKLIFT

BACKGROUND OF THE INVENTION

The invention concerns a transmission for a steerable drive wheel of a forklift according to the preamble of the main claim. Such transmissions have been disclosed in DE 31 33 027 or DE 44 24 305. In the forklift the transmissions are pivotable around a vertical axle via a rocking bearing. The transmissions have a spur gear stage and a second reduction stage. The pinion of the spur gear stage can be driven by a slip-on electric motor and drives a spur gear sitting upon a pinion shaft. The pinion teeth of the second reduction stage are located, as a rule, directly upon the vertical pinion shaft. The vertical pinion shaft is supported in the transmission housing by means of roller bearings. The roller bearing in the area of the pinion of the second reduction stage being designated as pinion gearing. The bevel gear of the second reduction stage is non-rotatably connected with the drive wheel by a horizontal output shaft.

The required high reduction ratio of the second reduction stage causes very strong reaction forces on the pinion bearing when the forklift is accelerated or decelerated. The maximum load capacity of the pinion bearing and of the toothing is reached as the load stresses increase. For certain applications, it is not possible to enlarge the dimensions of the transmission, due to a lack of installation space. The outer dimensions are limited by the enveloping circle when the transmission is pivoted and by the housing in the area of the bevel gear. The housing must project below, not above, the rim of the drive wheel in order that damage to the transmission can be eliminated in case of defective tires of the drive wheel.

SUMMARY OF THE INVENTION

Departing from the already known transmission, the problem to be solved by the invention is to provide a transmission with a capacity for high load stresses While being limited by preset limits of the outer dimensions and a preset reduction ratio. Particularly, the invention must obtain a higher load capacity at the pinion bearing and at the pinion teeth. The problem is solved by the fact that the second reduction stage is designed as a hypoid wheel set with positive axle offset.

In such a known hypoid wheel set described, for example, in Niemann's "Maschinenelements" Vol. 3, 1983, the pinion axle does not cut the bevel gear axle. It is offset around the so-called crossing step or hypoid offset. In positive offset, the diameter of the hypoid pinion (with equal bevel gear diameter and equal ratio) becomes larger than in corresponding bevel gear transmissions. The larger pinion diameter makes possible a thicker pinion shaft and therewith a larger design of the pinion bearing. This larger design of the pinion bearing cannot be used in the transmissions known due to the smaller pinion diameter. The positive offset produces a larger helix angle of the pinion, which determines a larger length per tooth that takes part in the meshing and a larger overlap ratio. This has an advantageous effect upon the load capacity.

When the pinion bearing abuts directly axially on the teeth of the hypoid pinion, an advantage is obtained by minimizing the bearing stresses.

The maximum thickness of the pinion shaft is obtained when the diameter of the pinion shaft is equal to the root diameter of the hypoid pinion in the transition between the toothing region and the cylindrical part of the pinion shaft.

A specially silent operation of the transmission and a high load capacity are obtained when the gears of the hypoid wheel set are spiral cut.

BRIEF DESCRIPTION OF THE DRAWING(S)

The invention is explained in detail herebelow with reference to the enclosed drawings in which FIG. 1 shows a sectional illustration of the transmission according to the invention;

DESCRIPTION OF THE PREFERRED EMBODIMENT(S)

Figure 1:
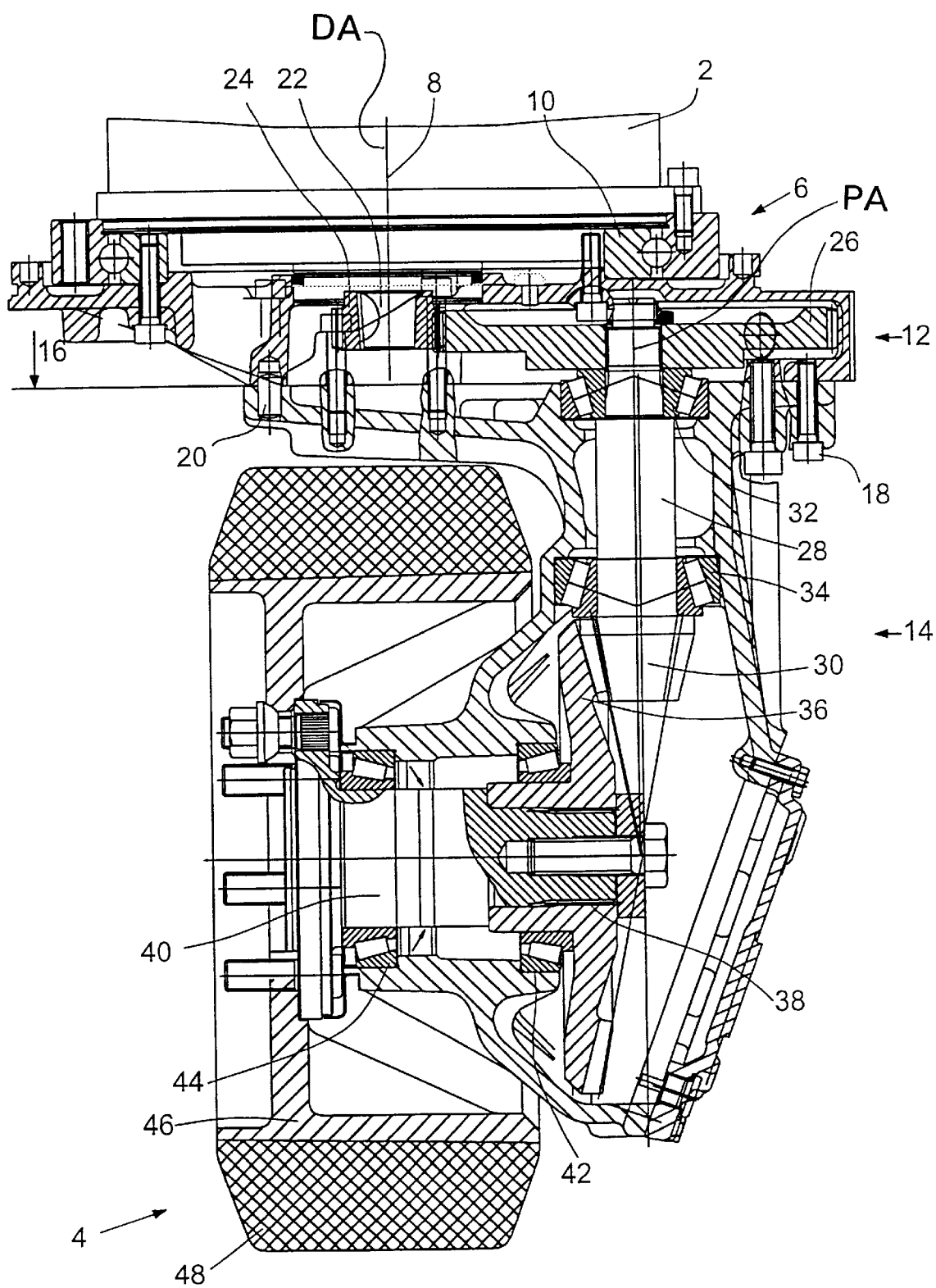

The transmission shown in FIG. 1 for a forklift creates the operative connection between the electric motor 2, shown only in part, and the drive wheel 4. In the forklift the transmission, including the drive wheel 4, is suspended pivotally around the vertical motor shaft axle 8, defined a drive axis DA by means of a rocking bearing 6. The devices needed for pivoting are known and are not shown, since they are in no way related to the invention. The inner ring 10 of the rocking bearing 6 is integrated in an upper housing part 12 which together with the lower housing part 14 forms the transmission housing. The housing parts are interconnected on the joint 16 by bolts 18 and centering pins 20. On the motor shaft 22 is fastened the pinion 24 of a spur gear stage. The pinion 24 meshes with a spur gear 26 which is fastened on the free upper end of a vertical pinion shaft 28, 30 belonging to the hypoid wheel set. The toothed region of the hypoid pinion 30 is located on the free lower end of the pinion shaft 28, having pinion rotational axis PA. The pinion shaft is supported in the lower housing part 14 by two roller bearings, an upper roller bearing 32 and a lower roller bearing designated as pinion bearing 34. The bevel gear 36 of the hypoid wheel set is non-rotatably connected by interlocking teeth 37 with a horizontal output shaft 40. The output shaft 40, with an output shaft axis SA, is supported in the lower housing part 14 by means of two roller bearings 42, 44 and is connected with the rim 46 of the output wheel 4 which supports the tire 48.

Upon accelerations or decelerations of the forklift, the pinion bearing 34 undergoes considerable stresses, especially in the radial direction. The pinion bearing 34 abuts axially directly on the toothed region of the hypoid pinion 30 in order to keep as short as possible the distance of the lines of action of the toothing force and of the bearing force. This step minimizes the bearing force of the pinion bearing 34. But this arrangement also limits the maximum diameter of the pinion shaft 28 or of the inner ring of the bearing 34. For reasons of processing and durability, the pinion shaft 28 should not have, in the area of the bearing seat, any recesses produced by the cutting of teeth.

Compared to known transmissions having the same outer dimensions and the same reduction ratios, the diameter of the pinion shaft 28 and therewith the size of the pinion bearing 34 are larger and have more supporting capacity. This is made possible by the fact that the second reduction step is designed as a hypoid wheel set with positive axle offset.

Figure 2:
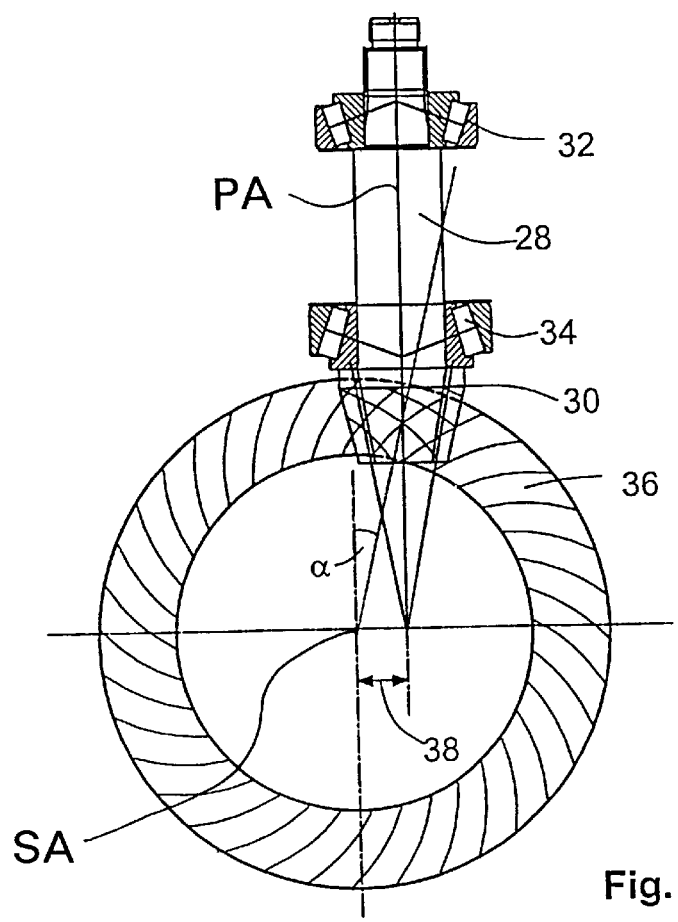
FIG. 2 shows in sideview the hypoid wheel set of the transmission according to the invention.

FIG. 2 shows a sideview of the hypoid wheel set consisting of hypoid pinion 30 and bevel wheel 36. The positive axle offset 38 causes the helix angle of the helical or spiral cut pinion around the contact angle to be larger than the helix angle of the bevel wheel. Thereby the diameter of the pinion (with equal bevel wheel diameter and equal ratio) becomes larger than in the corresponding bevel-gear drive. The pressure upon the tooth flanks, and therewith the inclination to pitting, turns out to be less. The larger helix angle of the pinion produces a larger transverse module and thus a larger diameter with equal number of teeth. Thereby is made possible a larger diameter of the pinion shaft 28 and of the bearing inner ring of the pinion bearing 34. The larger design of the pinion bearing 34 allows for a greater load capacity.

Another advantage of the thicker pinion shaft results from the greater rigidity and the accompanying lower flexure of the pinion shaft under load whereby an even support of the toothing is obtained.

The transmission according to the invention with the second reduction stage designed as a hypoid wheel set altogether satisfies higher load requirements wherein preset limits of the outer dimensions and a preset reduction ratio must be adhered to. Also clearly seen in FIG. 2, a larger angle produces more flank length per tooth taking part in the meshing and a greater overlap ratio. Advantageous values for the axle offset 38 are in the range of the seventh to thirteenth part of the bevel wheel diameter with helix angles of the hypoid pinion of 44° and of the bevel wheel of 31°.

Figure 3:
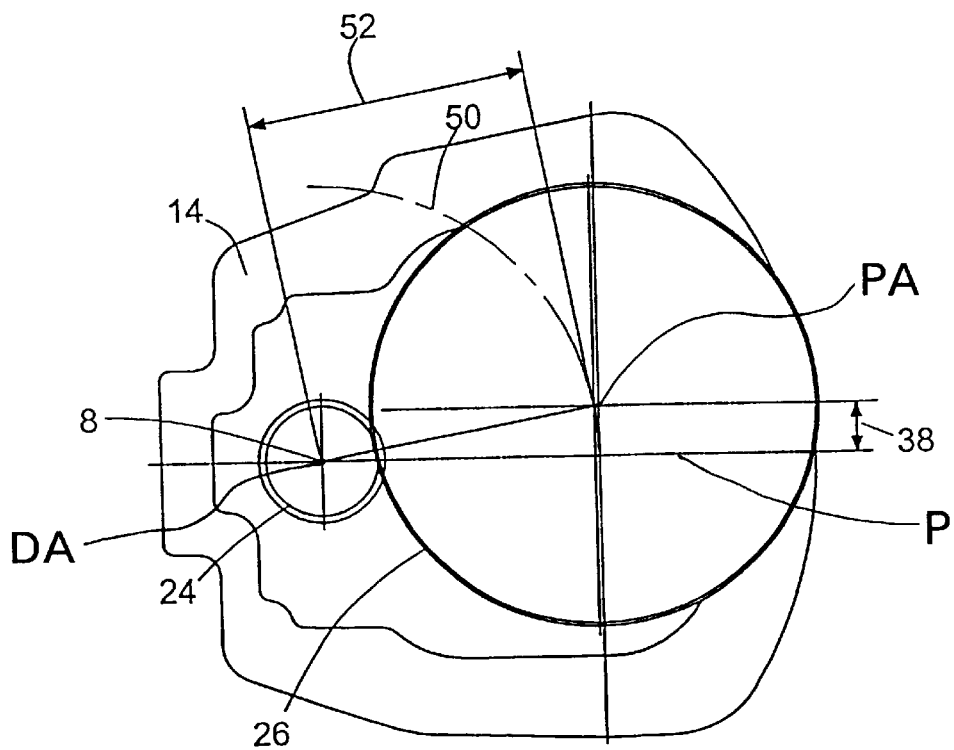
FIG. 3 shows a topview.

In the topview of FIG. 3 is diagrammatically shown the flange surface of the lower housing part 14. The spur wheel stage consisting of pinion 24 and spur gear 26 is shown only in outline. The axle offset 38, with respect to plane P in which the drive and output shaft rotational axes DA and SA lie, in travel direction can be clearly seen. Based on a design of the transmission without hypoid wheel set, the axle offset was produced by the pinion shaft 28 being moved together with the hypoid pinion 30 and the spur gear 26 (FIG. 1) along an orbit 50 around the motor shaft axle 8 or pivot axle. Hereby could be prevented an enlargement of the enveloping circle in the critical range of the spur gear 26 and a change of the center of distance 52 or of the reduction ratio between pinion 24 and spur gear 26.

REFERENCE NUMERALS 2 electric motor
4 drive wheel
6 rocking bearing
8 motor shaft axle (=swivel axis)
10 inner ring
12 upper housing part
14 lower housing part
16 joint
18 bolt
20 centering pin
22 motor shaft
24 pinion
26 spur gear
28 pinion shaft
30 hypoid pinion
32 roller bearing
34 pinion bearing
36 bevel wheel
37 interlocking teeth
38 axle offset
40 output shaft
42 roller bearing
44 roller bearing
46 rim
48 tire
50 orbit
52 center distance

What is claimed is:

1. A transmission for a steerable drive wheel of a forklift comprising:

a vehicle chassis supporting a transmission housing (12, 14), and the transmission housing (12, 14) being rotatable relative to a vertical drive axle (8);

an electric motor (2) connected to a first end of the vertical drive axle (8) to supply driving power to the vertical drive axle (8), and a second end of the vertical drive axle (8) supporting a pinion (24);

a vertical pinion shaft (28) having a rotational pinion axis (PA), the pinion shaft (28) also having a first end and a second end, the first end of the pinion shaft (28) supporting a spur gear (26), and the spur gear (26) matingly engaging with the pinion (24) of the vertical drive axle (8) to transmit driving power from the electric motor (2) to the pinion shaft (28);

the second end of the pinion shaft (28) supporting a bevel hypoid pinion (30);

a horizontal output shaft (40) having a rotational output shaft axis (SA) and the horizontal output shaft (40) having a first end and a second end;

the first end of the output shaft (40) being coaxially connected to a bevel wheel (36), and the bevel wheel (36) having a bevel wheel surface (35);

the second end of the output shaft (40) supporting the steerable drive wheel (4), and the bevel wheel (36) is located between the rotational pinion axis (PA) of the vertical pinion shaft (28) and the steerable drive wheel (4); wherein during operation of the transmission, the electric motor (2) drives the vertical drive axle (8), the pinion (24), the spur gear (26), the vertical pinion shaft (28), the bevel pinion (30), the bevel wheel (36) and the horizontal output shaft (40) to supply driving power to the steerable drive wheel (4); and wherein the bevel wheel (36) matingly engages the bevel-pinion (30) at an engagement point on the bevel wheel surface (35) wherein the engagement point is offset horizontally to and vertically above the output shaft axis (SA) such that the rotational pinion axis (PA) of the vertical pinion shaft (28) is oriented parallel to and spaced apart horizontally from a plane passing through the output shaft axis (SA) of the horizontal output shaft (40) and vertically bisecting the bevel wheel (36) into two quadrants and does not intersect with the output shaft axis (SA) of the horizontal output shaft; wherein a set of teeth of the hypoid pinion gear (30) and a mating set of teeth of the bevel wheel (36) are a hypoid wheel set in which both sets of teeth are helically cut teeth; and the horizontal offset of the rotational pinion axis (PA) of the vertical pinion shaft (28) relative to the output shaft axis (SA) of the horizontal output shaft (40) result in a contact angle between the teeth of the hypoid pinion gear (30) and the mating teeth of the bevel wheel (36) wherein the helically cut teeth of the hypoid pinion gear (30) have a first helix angle which is larger than a second helix angle of the mating helically cut teeth of the bevel wheel (36); whereby the larger first helix angle of the hypoid pinion gear (30) with respect to the second helix angle of the bevel wheel (36) allows a larger diameter of the hypoid pinion gear (30) for a given number of hypoid pinion gear (30) teeth, thereby providing an increased flank length and overlap per tooth of the hypoid pinion gear (30) and the bevel wheel (36) and an increased diameter of the pinion shaft (28), thereby providing increased load bearing capacity of the transmission.

2. The transmission for the steerable drive wheel of the forklift according to claim 1 wherein the bevel pinion (30) further comprises a hypoid pinion gear having teeth attached to the second end of the vertical pinion shaft (28) for engaging a plurality of mating teeth on the bevel wheel (36).

3. The transmission for the steerable drive wheel of the forklift according to claim 2, wherein a pinion bearing (34), rotatably supporting the vertical pinion shaft (28), directly abuts axially on a bearing seat portion of the teeth of the hypoid gear, wherein the increased diameter of the pinion shaft (28) results in an increased diameter of a bearing surface of the pinion bearing (34) and provides an increased load bearing capacity in the pinion shaft (28) and pinion bearing (34).

4. The transmission for the steerable drive wheel of the forklift according to claim 1, wherein the positive offset is a distance in a range of about $\frac{1}{7}$ to $\frac{1}{13}$ of a diameter of the bevel wheel.

5. The transmission for the steerable drive wheel of the forklift according to claim 2, wherein the pinion shaft (28) has a diameter that is equal to the root diameter of the hypoid pinion in the transition between a toothing region and a cylindrical part of the pinion shaft.

* * * * *